United States Patent Office 3,096,196
Patented July 2, 1963

3,096,196
FLAME-RETARDANT ASPHALTIC ROOFING MATERIALS
Phillip Stephen Bettoli, Belle Mead, and Joseph Jacob Klimas, North Plainfield, N.J., assignors to The Ruberoid Company, a corporation of New Jersey
No Drawing. Filed Jan. 28, 1960, Ser. No. 5,109
10 Claims. (Cl. 117—32)

This invention relates to an asphalt coating composition which is highly resistant to fire and, more particularly, to improved fire-retardant asphalt roofing and shingle products having excellent exterior durability. The invention is based on the discovery that relatively small amounts of certain polyester and alkyd resins, when incorporated into an asphalt surface coating containing a mineral stabilizer, are capable of imparting excellent fire retardant characteristics to the coating and of increasing its resistance to flame propagation and thermal deformation under conditions which would normally consume the surface coating. Asphalt roofing and shingles manufactured with the asphaltic coating compositions of the invention provide an effective fire barrier upon exposure to severe heat or flame conditions.

The fire resistance of asphalt roofing is inherently dependent upon the ability of the surface coating to withstand melting or running and sliding when the roofing is exposed to severe heat conditions. If the surface coating of a particular asphalt roofing is enveloped by fire and melts, it tends to run down the incline and thereby expose the underlying saturated felt to a direct flame. The felt, and the continuously renewed surface of the flowing asphalt, both are capable of supporting sustained combustion. Asphalt roofings which are surfaced with mineral granules offer a higher degree of fire resistance than asphalt alone, since the very presence of these mineral granules decreases the rate at which the temperature of the surface coating rises and also provides some resistance to flow. Once the surface coating becomes molten, however, and begins to flow or slide, then the mineral granules are carried away by the molten asphalt and combustion commences as a self-generating process, destroying whatever protection the surface coating afforded as a fire barrier.

Under the most ideal conditions, the fire resistance of asphalt roofing can be improved by developing a porous, coked condition in the coating, since the coked surface blankets the saturated felt and tends to insulate it against further combustion. Coking of the surface coating can only take place, however, if the asphalt is held in place for a period of time sufficient to form a charred skeletal structure.

Using a coating asphalt which contained a mineral stabilizer, we have found that by incorporating from about 1 to about 25 percent by weight of a polyester (or alkyd) resin of a polycarboxylic acid and a polyol in the coating composition, the percentage of resin being based on the weight of the asphalt, it is possible to impart a pronounced fire resistance to the coating composition without materially affecting its rheological properties or altering the commercial methods by which it is applied to a saturated organic felt-base to form a roofing material. Roofing material or shingles manufactured by coating a saturated web base with this polyester (or alkyd) containing asphaltic composition demonstrate markedly improved fire resistance to the point where products can be manufactured by conventional methods that will meet every test imposed by the Underwriters' Laboratories for class A and class B designation of prepared roofing.

Accordingly, the improved fire-retardant asphaltic coating compositions of the invention comprise a blown petroleum asphalt having a softening point, when measured by the ball and ring method, in the range between 180° F. and 250° F., from about 1 to about 25 percent by weight of a polyester or alkyd resin of a polycarboxylic acid and a polyol intimately blended therewith, and a finely pulverized mineral stabilizer uniformly dispersed throughout the organic components of the coating composition, the percentage of the polyester resin being based on the weight of the blown petroleum asphalt contained in the coating composition.

The invention also contemplates an improved fire-retardant roofing material which comprises a saturated web base, such as paper felt or matted webs of fiberglass, coated with a layer of the fire-retardant asphaltic coating composition. This roofing material may be further surfaced by embedding mineral roofing granules in the asphaltic coating to provide a mineral-surfaced, fire-retardant roofing material. Both of these roofing materials may be manufactured by conventional methods, using a paper felt or fiberglass web which is saturated in the normal manner for roofing.

Although the mechanism by which these polyester or alkyd resin additives function to impart fire resistance to the coating composition is not completely understood, the resin is believed to exist in the asphalt either as a well-distributed dispersion or, especially in higher concentrations, as a lattice within the asphalt vehicle. On exposure of the coating to flame heat, the dispersed resin or lattice first gels or stiffens and thereby prevents the initial flowing or running of the asphalt. Continued exposure to this elevated temperature causes pyrolytic decomposition of the resin and contributes to puffing of the asphalt vehicle which, together with the resin, cokes and forms a porous blanketing or insulating structure.

Preparation of the fire-retardant asphaltic coating compositions of the invention is conveniently accomplished by proportionating both the asphalt and polyester (or alkyd) resin into a continuous mixer, after which the mineral stabilizer is uniformly dispersed throughout the two organic components of the composition. The blown petroleum asphalts which may be employed in the coating composition are those which are commonly used in the fabrication of class C roofing materials, the term "blown petroleum asphalt" being used to designate the product obtained by blowing air through residual oil at elevated temperatures. These blown asphalts generally possess a softening point, when measured by the ball and ring method, in the range from 180° F. to 250° F. In general, concentrations of the blown asphalt as low as 30 percent by weight have been found satisfactory, but in many cases at least 40 percent by weight should be employed to obtain the desired rheological properties. There is no advantage generally in employing more than 60 percent by weight of the blown asphalt, and in most asphaltic coating compositions the blown asphalt will vary from 40 to 50 percent by weight of the total composition.

The number of finely pulverized mineral stabilizers which may be used in the fire-retardant bituminous coating compositions of the invention is almost legion, and includes stonedust, such as finely ground limestone or slate, silica sand, oyster shell, talc, and various types of mica, such as dry-ground mica, mica schist, and micaceous talcs, as well as asbestos, diatomaceous earth and fiberous talc. Additional suitable mineral stabilizers are described in the National Bureau of Standard Report No. 147, entitled Effect of Mineral Additives on the Durability of Coating-Grade Roofing Asphalts, issued September 1956, or in the monograph by Greenfeld, Laboratory Evaluation of Six Selected Commercially Available Materials as Stabilizers for Asphalt Roofing, published September 1953. Although these mineral stabilizers may be used over a wide range of concentrations, they are generally employed in the range from about 30 to about 60 percent by weight of the total coating composition, and preferably in the narrower range from 45 to 60 percent by weight of the composition.

Selection of a particular polyester or alkyd (the terms being interchangeably used) resin for inclusion in the bituminous coating composition of the invention is governed by three criteria, namely that the resin be sufficiently heat stable to withstand brief periods of elevated temperature without decomposing or vaporizing, that when incorporated in the asphalt it should not gel substantially when heated to a temperature in the general neighborhood of 400° F. for periods of five minutes more or less (or whatever length of time is required for preparing the mineral-filled asphalt-resin mix), and lastly that it be water-insensitive or water-insoluble so that the coating product will be able to retain the fire-resistant characteristics on prolonged exterior exposure. Among the most satisfactory polyester and alkyd resins are those prepared from dicarboxylic acids (or anhydrides) containing from 4 to 10 carbon atoms, such as phthalic acid (or anhydride), isophthalic acid, cis-4-cyclohexene-1,2-dicarboxylic acid anhydride, maleic anhydride, adipic acid, and sebacic acid. Various polyols may be used with these dicarboxylic acids, and include such polyhydroxy compounds as glycerin, pentaerythritol, ethylene glycol, propylene glycol, diethylene glycol, triethylene glycol, 1,6-hexamethylene glycol, and methyl glucoside. As indicated previously, these polyester or alkyd resins are used in concentrations ranging from about 1 to about 25 percent by weight, based on the weight of the blown asphalt in the coating composition, corresponding to a concentration range from about 0.5 to about 10 percent by weight, based on the total weight of the coating composition.

The roofing materials of the invention, including both the smooth-surfaced and mineral-surfaced types, may be manufatured on conventional batch or continuous equipment. In the continuous operation, the blown asphalt and liquid resin are proportioned into a continuous mixer into which the mineral stabilizer is simultaneously added and dispersed throughout the organic components, the total dwell time in the mixer generally averaging les than three minutes, depending upon the rheological properties of the coating composition. The asphaltic coating composition is then continuously applied to a saturated web (paper felt or glass) to form a smooth-surfaced roofing material which in turn, may be surfaced with mineral roofing granules while the coating is still warm to form the mineral-surfaced roofing.

Table I lists the chemical compositions and Table II the physical properties of eight different polyester and alkyd resins which were employed in preparing the asphaltic coating compositions which were used in carrying out the examples of the invention that are set forth below. Each of the polyester and alkyd resins listed in Tables I and II was prepared by standard condensation polymerization techniques, using a solvent to remove the water formed during esterification by azeotropic distillation and an inert gas blanket to prevent oxidation of the reaction mixture. When the resin had reached the desired degree of polymerization, as measured by either its acid number or viscosity, the solvent was removed by vacuum distillation.

TABLE I

*Chemical Compositions of Polyester and Alkyd Resins Used in Asphaltic Coating Compositions*

| Composition (Mol percent) | Resin number | | | | | | | |
|---|---|---|---|---|---|---|---|---|
| | 1 | 2 | 3 | 4 | 5 | 6 | a 7 | a 8 |
| Cis-4-cyclohexene-1,2-dicarboxylic acid anhydride | 50 | | | | | | | |
| Phthalic anhydride | | 43 | | | | | 38-42 | 37-41 |
| Maleic anhydride | | | 47.4 | | | | | |
| Sebacic acid | | | | 50 | | | | |
| Adipic acid | | | | | 50 | 50 | | |
| Soya oil acids | | | | | | | 30-34 | 29-33 |
| Glycerin | | | | | | | 23-27 | 12-14 |
| Pentaerythritol | | | | | | | | 11-13 |
| Propylene glycol | | | | | 50 | 50 | 25 | |
| Diethylene glycol | | 43 | | | | | 25 | |
| Triethylene glycol | 50 | | 26.3 | | | | | |
| Methyl glucoside | | 14 | 26.3 | | | | | | a Composition given in percent by weight.

TABLE II

*Physical Properties of Polyester and Alkyd Resins Used in Asphaltic Coating Compositions*

| Property | Resin number | | | | | | | |
|---|---|---|---|---|---|---|---|---|
| | 1 | 2 | 3 | 4 | 5 | 6 | 7 | 8 |
| Physical state (25° C.) | Liquid | Solid | Solid | Liquid | Liquid | Liquid | Solid | Solid |
| Viscosity at 25° C. (centipoises): | | | | | | | | |
| Undiluted | 1,000,000 | | | a 1,680 | a 2,800 | a 60 | | |
| In cellosolve (3:1 resin to cellosolve) | 1,700-4,000 | 1,700-4,000 | 1,800-3,500 | | | | | |
| In xylol (55%) | | | | | | | b $Z_2$-$Z_5$ | b M-O |
| Specific gravity (25° C./15° C.) | 1.15-1.35 | | | 1.06 | 1.15 | 1.10 | | |
| Refractive index [$n_D^{25}$] | | | | 1.471 | 1.474 | 1.467 | | |
| Acid number | c 20 | 15-25 | 15-25 | 1.3 | 1.6 | 2.3 | 6-12 | 6-10 |
| Saponification number (mg. KOH/g.) | | | | 450 | 585 | 535 | | | a Viscosity in poises at 25° C.
b Gardner-Holdt viscosity scale.
c Maximum.

Table III lists eighteen different formulations of asphaltic coating compositions which were employed in the following examples of the invention. Each of the asphaltic coating compositions described in Table III was prepared by mixing the particular blown petroleum asphalt together with one of the polyester or alkyd resins listed in Tables I and II in a mixer, and then uniformly dispersing the mineral stabilizer or mineral stabilizers throughout the two organic components of the composition. The stonedust stabilizer which was employed in all of these

TABLE III

*Formulations of Fire-Retardant Asphaltic Coating Compositions*

| Composition (percent by weight) | Formula Number | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Blown asphalt 215/225 S.P | 41.9 | 50 | 44.4 | --- | --- | --- | --- | --- | --- | --- | --- | --- | --- | --- | --- | 41.7 | 42 | 41.9 |
| Blown asphalt 180/190 S.P | --- | --- | --- | 40 | 45 | --- | --- | --- | --- | --- | --- | --- | --- | --- | --- | --- | --- | --- |
| Blown asphalt 210/220 S.P | --- | --- | --- | --- | --- | 45.5 | 45.5 | --- | --- | --- | --- | --- | --- | --- | --- | --- | --- | --- |
| Blown asphalt 230/240 S.P | --- | --- | --- | --- | --- | --- | --- | 42.6 | 45 | 45 | 42.2 | --- | --- | --- | --- | --- | --- | --- |
| Blown asphalt 240/250 S.P | --- | --- | --- | --- | --- | --- | --- | --- | --- | --- | --- | 41.7 | 43 | 43 | 42.8 | --- | --- | --- |
| Pulverized stonedust | 51.1 | 35 | 47.7 | 50 | 50 | 45.5 | 45.5 | 48.5 | 50 | 50 | 48 | 47.6 | 49 | 49 | 48.7 | 47.6 | 49.5 | 49.9 |
| Pulverized mica | 5.1 | 5 | 7.5 | --- | --- | 4.5 | 4.5 | 6.9 | --- | --- | 6.9 | 6.8 | 7 | 7.25 | 7 | 6.8 | 7 | 6 |
| Diatomaceous earth | --- | --- | --- | --- | --- | --- | --- | --- | --- | --- | --- | --- | --- | --- | --- | --- | --- | --- |
| Resin No. 1 | 1.9 | 10 | 0.4 | 10 | 5 | --- | --- | --- | --- | --- | --- | --- | --- | --- | --- | --- | --- | --- |
| Resin No. 2 | --- | --- | --- | --- | --- | 4.5 | --- | --- | --- | --- | --- | --- | --- | --- | --- | --- | --- | --- |
| Resin No. 3 | --- | --- | --- | --- | --- | --- | 4.5 | --- | --- | --- | --- | --- | --- | --- | --- | --- | --- | --- |
| Resin No. 4 | --- | --- | --- | --- | --- | --- | --- | 2 | 5 | --- | --- | --- | --- | --- | --- | --- | --- | --- |
| Resin No. 5 | --- | --- | --- | --- | --- | --- | --- | --- | --- | 5 | 2.9 | --- | --- | --- | --- | --- | --- | --- |
| Resin No. 6 | --- | --- | --- | --- | --- | --- | --- | --- | --- | --- | --- | 3.9 | 1 | --- | --- | --- | --- | --- |
| Resin No. 7 | --- | --- | --- | --- | --- | --- | --- | --- | --- | --- | --- | --- | --- | 0.75 | 1.5 | 3.9 | --- | --- |
| Resin No. 8 | --- | --- | --- | --- | --- | --- | --- | --- | --- | --- | --- | --- | --- | --- | --- | --- | 1.5 | 2.2 | coating compositions was a finely pulverized rock or slate dust having the following typical screen analysis:

| U.S. standard screen mesh: | Percent retained |
|---|---|
| 20 | 0 |
| 40 | 0.5 |
| 60 | 5–10 |
| 80 | 10–15 |
| 100 | 10–15 |
| 200 | 20–25 |
| Passing 200 | 40–50 |

In many of these formulations, however, a finely pulverized mica or diatomaceous earth was also used as a mineral stabilizer in conjunction with the stonedust stabilizer.

In each of the following examples of the invention, which are summarized in Table IV below, the particular bituminous coating composition (described in Table III) was applied to a saturated organic felt base to form a roofing material or shingle which was then subjected to a laboratory flame exposure test to determine its fire-retardant properties. The standards established for this laboratory flame exposure test, which is intended to measure the fire-retardant characteristics of asphalt-type roof coverings, particularly with regard to flame spread, combustion, and surface sliding, are designed to correlate with the results obtained with the test procedure set forth by the Underwriters' Laboratories, Inc. as being requisite for designation of a roofing material as meeting class A standards.

The laboratory flame test apparatus consisted of a gas jet mounted at a 42.5° angle from horizontal and in such manner that the flame was directed at an inclined roof deck upon which the test specimens were fastened. The roof deck was 8" wide and 30" long and mounted at an incline of 5" rise per horizontal foot. Air was caused to flow across the roof deck to direct the flame out and over the roof deck. To minimize air turbulence, the entire apparatus was housed in an enclosed laboratory hood which was closed during the test period.

In each test 6" x 8" roofing sections were mounted in six courses along the inclined deck so as to leave a normal 5" exposed butt. The test was conducted by turning on the hood exhaust fan to produce an air flow, and then igniting the gas flame, the flow of which was regulated so that it possessed a flame temperature of about 1800° F. at a point just above the bottom edge of the first roofing course. Time from the start of the test until ignition of each course was noted, thus determining the rate of ignition advance along the deck. Ignition was recognized by flecks of yellow sparks or flame emanating from the roof material. The gas flame was extinguished when ignition began on the highest shingle course. Any actual burning, or self-supported combustion, of the roof material was allowed to continue and the time recorded when self-extinguishing took place.

TABLE IV

*Laboratory Flame Exposure Tests*

| Bituminous coating composition | Test results |
|---|---|
| Formula No. 1 | Excellent slide and flame resistance. |
| Formula No. 2 | Do. |
| Formula No. 3 | Do. |
| Formula No. 4 | Do. |
| Formula No. 5 | Do. |
| Formula No. 6 | All flame extinguished 1.5 minutes after turning off gas flame; excellent slide and flame resistance. |
| Formula No. 7 | Excellent slide and flame resistance; all flame extinguished 2 minutes after gas flame turned off. |
| Formula No. 8 | Passed laboratory flame exposure test with imperceptible to ½" slide after a 3 minute test period. |
| Formula No. 9 | Passed laboratory flame exposure test with trace to ½" slide after a 3 minute test period. |
| Formula No. 10 | Excellent slide and flame resistance after 3 minute test period. |
| Formula No. 11 | Do. |
| Formula No. 12 | Excellent flame resistance and self-coking properties. |
| Formula No. 13 | Do. |
| Formula No. 14 | Successfully withstands laboratory flame exposure test. |
| Formula No. 15 | Do. |
| Formula No. 16 | Do. |
| Formula No. 17 | Successfully withstands 3 to 4 minutes in laboratory flame exposure test with a maximum slide of up to ½" of surface coating; excellent flame resistance. |
| Formula No. 18 | Do. |

In each of the foregoing examples of the invention, asphaltic coating compositions containing a blown petroleum asphalt, a finely pulverized mineral stabilizer and a particular polyester or alkyd resin were used successfully to prepare fire-retardant roofing materials or shingles. Similar advantages are also attained using other polyester and alkyd resins. The common characteristics of these resins which make them eminently suitable for use in compositions of this invention are that they are sufficiently heat stable to withstand brief periods at elevated temperatures without decomposing or vaporizing, that they are resistant to rapid gelation when incorporated in the asphalt and heated to a temperature in the general neighborhood of 400° F. for periods of five minutes more or less (or whatever length of time is required for preparing the mineral-filled asphalt-resin mix) so that they may be dispersed in the asphalt vehicle without thermosetting, and that they are water-insoluble or water-insensitive so that the coating product

We claim:

1. A fire-retardant roofing material comprising a saturated felt base coated with a layer of an asphaltic coating composition comprising from about 40 to about 60 percent by weight of a blown petroleum asphalt having a softening point, when measured by the ball and ring method, in the range from 180° F. to 250° F., from about 1 to about 25 percent by weight of a polyester resin of a polycarboxylic acid and a polyol, and from about 30 to about 60 percent by weight of a mineral stabilizer uniformly dispersed throughout the organic components of the coating composition, the percentage of the polyester resin being based on the weight of the blown petroleum asphalt contained in the asphaltic coating composition.

2. A fire-retardant roofing material comprising a saturated felt base coated with a layer of an asphaltic coating composition comprising from about 40 to about 50 percent by weight of a blown petroleum asphalt having a softening point, when measured by the ball and ring method, in the range from 180° F. to 250° F., from about 1 to about 25 percent by weight of a polyester resin of cis-4-cyclohexene-1,2-dicarboxylic acid anhydride and a polyol, and from about 40 to about 60 percent by weight of a mineral stabilizer uniformly dispersed throughout the organic components of the coating composition, the percentage of the polyester resin being based on the weight of the blown petroleum asphalt contained in the asphaltic coating composition.

3. A fire-retardant roofing material comprising a saturated felt base coated with a layer of an asphaltic coating composition comprising from about 40 to about 50 percent by weight of a blown petroleum asphalt having a softening point, when measured by the ball and ring method, in the range from 180° F. to 250° F., from about 1 to about 25 percent by weight of a polyester resin of phthalic anhydride and a polyol, and from about 40 to about 60 percent by weight of a mineral stabilizer uniformly dispersed throughout the organic components of the coating composition, the percentage of the polyester resin being based on the weight of the blown petroleum asphalt contained in the asphaltic coating composition.

4. A fire-retardant roofing material comprising a saturated felt base coated with a layer of an asphaltic coating composition comprising from about 40 to about 50 percent by weight of a blown petroleum asphalt having a softening point, when measured by the ball and ring method, in the range from 180° F. to 250° F., from about 1 to about 25 percent by weight of a polyester resin of maleic anhydride and a polyol, and from about 40 to about 60 percent by weight of a mineral stabilizer uniformly dispersed throughout the organic components of the coating composition, the percentage of the polyester resin being based on the weight of the blown petroleum asphalt contained in the asphaltic coating composition.

5. A fire-retardant roofing material comprising a saturated felt base coated with a layer of an asphaltic coating composition comprising from about 40 to about 50 percent by weight of a blown petroleum asphalt having a softening point, when measured by the ball and ring method, in the range from 180° F. to 250° F., from about 1 to about 25 percent by weight of a polyester resin of sebacic acid and a polyol, and from about 40 to about 60 percent by weight of a mineral stabilizer uniformly dispersed throughout the organic components of the coating composition, the percentage of the polyester resin being based on the weight of the blown petroleum asphalt contained in the asphaltic coating composition.

6. A fire-retardant roofing material comprising a saturated felt base coated with a layer of an asphaltic coating composition comprising from about 40 to about 50 percent by weight of a blown petroleum asphalt having a softening point, when measured by the ball and ring method, in the range from 180° F. to 250° F., from about 1 to about 25 percent by weight of a polyester resin of adipic acid and a polyol, and from about 40 to about 60 percent by weight of a mineral stabilizer uniformly dispersed throughout the organic components of the coating composition, the percentage of the polyester resin being based on the weight of the blown petroleum asphalt contained in the asphaltic coating composition.

7. A fire-retardant roofing material comprising a saturated felt base coated with a layer of an asphaltic coating composition comprising from about 40 to about 60 percent by weight of a blown petroleum asphalt having a softening point, when measured by the ball and ring method, in the range from 180° F. to 250° F., from about 1 to about 25 percent by weight of a soya oil-modified alkyd resin of phthalic anhydride and a polyol, and from about 30 to about 60 percent by weight of a mineral stabilizer uniformly dispersed throughout the organic components of the coating composition, the percentage of the alkyd resin being based on the weight of the blown petroleum asphalt contained in the asphaltic coating composition.

8. A fire-retardant roofing material comprising a saturated felt base coated with a layer of an asphaltic coating composition comprising from about 40 to about 50 percent by weight of a blown petroleum asphalt having a softening point, when measured by the ball and ring method, in the range from 180° F. to 250° F., from about 1 to about 25 percent by weight of a soya oil modified alkyd resin of phthalic anhydride and at least one polyol of the group consisting of glycerin, pentaerythritol, ethylene glycol, propylene glycol, diethylene glycol, triethylene glycol, and methyl glucoside, and from about 40 to about 60 percent by weight of a mineral stabilizer uniformly dispersed throughout the organic components of the coating composition, the percentage of the alkyd resin being based on the weight of the blown petroleum asphalt contained in the asphaltic coating composition.

9. A mineral-surfaced fire-retardant roofing material comprising a saturated web base coated with a layer of a fire-retardant asphaltic coating composition and surfaced with mineral roofing granules embedded in the asphaltic coating, the fire-retardant asphaltic coating composition comprising from about 40 to about 60 percent by weight of a blown petroleum asphalt having a softening point, when measured by the ball and ring method, in the range between 180° F. and 250° F., from about 1 to about 25 percent by weight of a polyester resin of a polycarboxylic acid and a polyol, and from about 30 to about 60 percent by weight of a mineral stabilizer uniformly dispersed throughout the organic components of the coating composition, the percentage of the polyester resin being based on the weight of the blown petroleum asphalt contained in the asphaltic coating composition.

10. A mineral-surfaced fire-retardant roofing material comprising a saturated web base coated with a layer of fire-retardant asphaltic coating composition and surfaced with mineral roofing granules embedded in the asphaltic coating, the fire-retardant asphaltic coating composition comprising from about 40 to 50 percent by weight of blown petroleum asphalt having a softening point, when measured by the ball and ring method, in the range between 180° F. and 250° F., from about 1 to about 25 percent by weight of a soya oil-modified alkyd resin of phthalic anhydride and a polyol, and from about 30 to about 60 percent by weight of a mineral stabilizer uniformly dispersed throughout the organic components of the coating composition, the percentage of the alkyd resin being based on the weight of the blown petroleum asphalt contained in the asphaltic coating composition.

References Cited in the file of this patent
UNITED STATES PATENTS

| | | |
|---|---|---|
| 1,995,957 | Barrett | Mar. 26, 1935 |
| 2,159,586 | Greider et al. | May 23, 1939 |
| 2,347,233 | Abernathy | Apr. 25, 1944 |
| 2,442,707 | Olson et al. | June 1, 1948 |